US007541969B2

(12) United States Patent
Åkerström et al.

(10) Patent No.: US 7,541,969 B2
(45) Date of Patent: Jun. 2, 2009

(54) RADAR LEVEL GAUGING SYSTEM FOR USE AT SEA

(75) Inventors: Thomas Åkerström, Västra Frölunda (SE); Anders Welin, Torslanda (SE)

(73) Assignee: Rosemount Tank Radar AB, Gothenburg (SE)

( * ) Notice: Subject to any disclaimer, the term of this patent is extended or adjusted under 35 U.S.C. 154(b) by 49 days.

(21) Appl. No.: 11/807,983

(22) Filed: May 31, 2007

(65) Prior Publication Data

US 2008/0297403 A1    Dec. 4, 2008

(51) Int. Cl.
*G01S 13/08*    (2006.01)
(52) U.S. Cl. ........................ 342/124; 342/118
(58) Field of Classification Search ............ 342/26 R, 342/26 A, 26 B, 26 C, 26 D, 124; 73/290 R, 73/290 B; 705/55
See application file for complete search history.

(56) References Cited

U.S. PATENT DOCUMENTS

| | | | | |
|---|---|---|---|---|
| 4,101,891 A | * | 7/1978 | Fletcher et al. | 342/25 A |
| 4,847,623 A | * | 7/1989 | Jean et al. | 342/124 |
| 5,015,995 A | * | 5/1991 | Holroyd | 340/621 |
| 5,115,242 A | * | 5/1992 | Nagamune et al. | 342/124 |
| 5,305,237 A | * | 4/1994 | Dalrymple et al. | 702/55 |
| 5,321,408 A | * | 6/1994 | Jean et al. | 342/124 |
| 5,337,289 A | * | 8/1994 | Fasching et al. | 367/140 |
| 5,351,036 A | * | 9/1994 | Brown et al. | 340/618 |
| 5,406,842 A | * | 4/1995 | Locke | 73/290 R |
| 5,973,770 A | * | 10/1999 | Carter et al. | 356/4.09 |
| 6,107,957 A | * | 8/2000 | Cramer et al. | 342/124 |
| 6,795,015 B2 | * | 9/2004 | Edvardsson | 342/124 |
| 7,098,843 B2 | * | 8/2006 | Abrahamsson | 342/124 |

FOREIGN PATENT DOCUMENTS

| | | |
|---|---|---|
| DE | 196 54 785 A1 | 7/1998 |
| WO | WO 01/29523 A1 | 4/2001 |
| WO | WO 02/14803 A1 | 2/2002 |
| WO | WO 03/001160 A1 | 1/2003 |

OTHER PUBLICATIONS

Applicability of Radar Level Gauges in Wave Monitoring Stephan Mai Proc. of the 2nd Int. Conf. Port Development & Coastal Environment, Varna, Bulgaria, 2000.*
Comparison of Slope, Wave Height, and Radar Spectra, Slope and Hydrodynamic Modulation of Radar Scatter from the Sea Hesany, V.; Moore, R.K.; Haimov, S.; Geoscience and Remote Sensing Symposium, 1992. IGARSS '92. International vol. 2, 1992 pp. 1768-1770.*
Laboratory studies of the spectral properties of sea spikes M.A. Sletten; D.B. Trizna; J. Wu; Radar Conference, 1993., Record of the 1993 IEEE National 1993 pp. 57-59.*

(Continued)

*Primary Examiner*—Thomas H Tarcza
*Assistant Examiner*—Peter M Bythrow
(74) *Attorney, Agent, or Firm*—Westman, Champlin & Kelly, P.A.

(57)    ABSTRACT

A radar level gauging system for determining a filling level of a liquid in a tank arranged in a mobile unit is disclosed. The system is comprises a processing circuitry for determining a local and momentary filling level at different times at a certain position in the tank of the container based on received echo signals, and is further adapted to identify variations between said local and momentary filling levels corresponding to surface waves in the tank due to movement of said mobile unit. The result of this identification is used for improving the accuracy when estimating an average filling level of the tank.

38 Claims, 2 Drawing Sheets

OTHER PUBLICATIONS

Barjenbruch, Mai, Ohle, Mertinatis, Irschik HYDRO 2002 Monitoring of water level, waves and ice with radar gauges Hydrographic Surveying and Mapping.*

International Search Report, International Application No. PCT/SE208/050411, dated Aug. 27, 2008.

* cited by examiner

RADAR LEVEL GAUGING SYSTEM FOR USE AT SEA

FIELD OF THE INVENTION

The present invention relates to a radar level gauging system for determining a filling level of a liquid contained in a tank arranged in a mobile unit, and in particular a tank arranged in a maritime vessel or platform. In particular, the present invention improves the accuracy of filling level estimations when there are surface waves in the liquid stored in the tank. The invention is also related to a corresponding method for determining such a filling level.

BACKGROUND OF THE INVENTION

Radar level gauging (RLG) to measure the level of various filling materials, such as liquids, is an increasingly important method for level gauging in tanks, containers, etc, and many different types of RLG systems are previously known.

One field in which RLG systems are commonly used is for tanks in moving units, such as tanks on marine platforms or on tanker ships, for storage of liquid gas, oil, chemicals etc. These tanks are normally designed as large rectangular blocks, for which the area of the base can be very big, as great as the size of a football pitch with a height of up to 40 m. Since the area of the base of a tank of this type is large, it is of utmost importance that the liquid level can be read with a high degree of accuracy. The large area implies that small changes in the liquid level correspond to relatively large changes in the volume of liquid.

Operation of modern tankers has evolved to also encompass operations outside conventional port terminals, which makes it challenging to meet for example the accuracies of the tank gauging system required according to custody transfer specifications. The encountered situations involve both discharge at offshore located facilities, such as LNG ("Liquefied Natural Gas") vessels operating at buoys and other gravity based structures (GBS), and ship to ship transfers in open sea, and FPSO ("Floating Production, Storage and Offloading") offloading to shuttle tankers and lightering ship operations.

In such environment, the vessels will meet sea conditions during the cargo transfer up to its certified limits for safe operation with unlimited tank filling levels.

There is a requirement for custody transfer measurement system (CTMS) to gauge the start and final filling level for the transfer operation with a high degree of accuracy. Further, a frequent number of operations with LNG require the discharging vessel to leave a certain amount of liquid in the tanks for keeping the tanks cold during the ballast voyage to a loading port and/or to provide boil-off gas for subsequent use.

For traditional radar level gauging systems used in controlled environments, e.g. on ships in port, solutions are known to facilitate the interpretation for the operator of the gauged parameter (tank level/ullage), such as low pass filtering or moving average filters. However, simple preset or even adaptive filtering has several limitations. E.g. a setting with high filter factor providing an apparent steady level in open sea environment will react to slowly for use in port operations. Also the filters used currently in level applications are generally designed to handle only smaller variations in liquid movement or designed to remove imperfection in the electronics/microwave circuitry, and there is today no known way of handling situations where the external environment starts to greatly affect the inside tank environment.

Further, in LNG ships, tank gauging systems required to operate accurately down to very low levels, typically down to some cm from the tank bottom, in stable environment, now also are required to provide the same custody transfer compliant accuracy and apparent steady level in open sea environment as they do in port operations under calm conditions.

Some attempts have been made to increase the accuracy of measurements in tanker applications. For example, WO 01/029523, by the same applicant, discloses a special method for reducing the uncertainty of level measurements close to the bottom for LNG tanks. A level measuring system like this also uses low pass filtering of the calculated/corrected level or ullage to provide "smoothing" of the presented and recorded level value for normal small tank liquid surface disturbances caused by the ship encountering light swells, vibrations or pumping to/from the tank. Further, WO 01/029523, also by the same applicant, teaches the use of an absorber to be used at the bottom of the tank to reduce tank bottom reflection. Further, it is known to improve the determinations of very low levels in LNG tanks by use of a bottom located temperature sensor to correlate the measured low level with the actual temperature. When the temperature at this point is significantly higher than the liquid temperature (LNG is typically about −160 degrees Celsius), it means that the tank is "dry" at the measuring point. Such correlation of data for robust determination of empty tank is feasible when the vessel is at a port terminal, but not feasible at open sea, due to the apparent conflict between the periodic (typically 0.1 Hz) behavior of the level as well as the bottom temperature and the normally used smoothing filter.

For the above-discussed reasons, and for both LNG and other applications onboard mobile units, there is therefore a need for an improved RLG system for determining a filling level of a liquid in a tank arranged in a mobile unit in which there are surface waves in the stored liquid due to movement of said mobile unit.

SUMMARY OF THE INVENTION

It is therefore an object of the present invention to provide an improved radar level gauging system and a radar level gauging method which eliminate or at least alleviate the above-discussed problems of the prior art.

This object is achieved with a radar level gauging system and method in accordance with the appended claims.

According to a first aspect of the present invention there is provided a radar level gauging system for determining a filling level of a liquid in a tank arranged in a mobile unit, said system comprising:

a transmitter for transmitting microwave signals towards said liquid;

a receiver for receiving reflected echo signals from the tank; and processing circuitry for determining a local and momentary filling level at different times at a certain position in the tank of the container based on said received echo signals;

wherein the processing circuitry is further adapted to identify variations in said local and momentary filling levels corresponding to surface waves in the tank due to movement of said mobile unit, and to use the result of said identification for improving the accuracy when estimating an average filling level of the tank.

The identification of variations corresponding to surface waves in the tank, it becomes possible to implement a number of various corrective actions, both in terms of directly increasing the accuracy of the estimated average filling level of the tank, and in terms of issuing alarm signals and the like when the estimated average filling level becomes less reliable.

Hereby, the operator can be always provided with a consistent filling level readout for the immediate operation.

Further, the gauge according to the invention will be able to adapt its behavior to the current tank environment conditions. Hereby, the robustness of the gauge will dramatically increase. Elimination of the previously experienced ambiguity makes it possible for the operator always to trust that the gauge will produce a level value under a wide spectrum of tank conditions, and a fast adaptation is possible for various environmental tank conditions.

Thus, the RLG system of the invention improves the robustness, enhances the accuracy and prevents distorted estimations of cargo level in general, and is e.g. useful for LNG applications, such as for estimating remaining cargo at the end of a discharge process, making it possible to utilize the full accuracy of a modern radar-based CTMS, with typically 5 mm uncertainty. However, the invention is also useful for many other types of applications in tanks onboard mobile units. The improved accuracy and reliability is of significant economic importance, and with the invention, the uncertainty from the level gauging in tanks will become negligible in comparison with other involved uncertainties.

Thus, the present invention enhances the performance, accuracy and robustness in the normal port terminal operation and achieves a comparable level accuracy at any level also in open sea situations. The methods are suitable for any liquid cargo, and e.g. for light liquefied gases as well as any other clean liquid chemical substance, which does not accumulate deposits on the tank bottom.

According to one line of embodiments the result of the identification is used for detection of local and momentary filling levels being equal to a bottom level of the tank. Preferably, the processing circuitry is arranged to estimate the average filling level of the tank based on a filtering of the determined local and momentary filling levels, and wherein the discriminated occurrence at certain times of local and momentary filling levels being equal to a bottom level of the tank is usable as an accuracy indicator.

Hereby, great improvements in the low level accuracy are obtainable. This is due to the realization of the present inventors that in order to make a best possible determination of the average level at low levels in the tank when the liquid in the tank is moving due to sea effects on the vessel, it must be ascertained that there is liquid continuously at the measuring point.

Thus, an average filling level may be estimated, e.g. calculated based on a low pass filtering of the continuously determined momentary filling levels, and at the same time the estimated average filling level can be adapted to the encountered environmental situation.

Occurrence of local and momentary filling levels being equal to a bottom level of the tank is preferably discriminated based on a relation between an amplitude and/or a signal strength of the received echo signals and a defined threshold value. Hereby, it can be discriminated in real time (typically 1 Hz sampling) if the signal amplitude/strength of the returned radar echo is above or below a defined threshold, which discriminates between liquid echo, and the echo from the absorber device with lower amplitude/strength on an LNG tank bottom or the higher echo from another tanker tank bottom.

Occurrence of filling levels being equal to the bottom level can be announced to the operator, e.g. in duty-cycle form, in order to inform him/her to take appropriate action. Such action can be either a) to stop discharging to allow the most accurate determination of average level for the remaining cargo before the estimation is distorted, or b) continue to discharge until there is no detection of liquid any longer ant the tank can be regarded as completely empty and dry, preferably verified with the correlation of a secondary indicator, such as continuously measurement of the temperature in the vicinity of the bottom by means of a temperature sensor.

Further, the radar level gauging system in an LNG tank preferably comprises a waveguide in the form of a vertically arranged pipe, through which the transmitted and received microwave signals are propagated, whereby the filling level is determined at a position in the pipe or below an opening of said pipe. The pipe is preferably perforated, as is per se known in the art. Still further, it is preferred that an absorber for microwaves is placed at the bottom of the LNG tank, below the opening of the pipe, to absorb at least part of the microwave energy that is incident on the base of the tank. In this case, and thanks to the discrimination of local and momentary filling levels being equal to a bottom level of the tank, the absorber can be allowed to be more ideal, i.e. attenuate as perfect as possible, without the current requirements of being detectable at "dry" tank. In this case, the system can generate a fictive level as representative for the bottom measurement when the tank is empty. This optimized performance of the absorber, previously not feasible, will further reduce the conflicting tank echoes and reduce the measuring uncertainty in the low region in an LNG tank before the fictive dry level is presented Preferably, the average filling level of the tank is estimated based on a filtering of the determined local and momentary filling levels.

According to another line of embodiments, the processing circuitry is further arranged to determine, based on the identification of the variations in the local and momentary filling levels, the magnitude of the surface waves in the tank, and based on this, to adapt the filtering for the estimation of the average filling level.

By this automatic selection of an adequate filtering, a stable average tank level can be established despite waves and turbulence, since the gauge will automatically adjust itself to the current external environmental conditions, which it will encounter in open sea. Further, by making the gauge adaptive and still be able to respond to a change in liquid states as quickly as the current tank environmental conditions allow, will greatly improve the robustness of the gauge.

By the monitoring of the surface waves within the tank, it is possible to produce an output with variations less than the nominal accuracy since an adequate filter character type can automatically be determined. Hereby, the filter character type may always be selected to provide an optimal filter which provides the fastest liquid change with respect to the current environmental condition within the tank.

Typical wave periods in tanks onboard a ship are 8-10 seconds, and current radar level gauges are capable of level detection with a rate shorter than one second. The filling level can be established by "tracking" of the surface level, and with an adequately high rate, the detection can be made immune to sporadic losses of echo due to local turbulences or other surface effects momentarily reducing the radar echo.

The magnitude of the surface waves is preferably determined based on wave height and/or wave periodicity determined from the local and momentary filling levels.

The processing circuitry is preferably arranged to select, based on the determined magnitude of the surface waves in the tank, one of a plurality of available filter character types. The filter character types may be implemented in software, and made available for a controller in a software directory or the like. The available filter character types may e.g. be a filter character for harbor conditions, a set of filter character type suitable for the different types of sea states with low magnitude of surface waves and a filter character type for high magnitude of surface waves. Essentially any type of filter character types can be used, e.g., low pass filtering, Butterworth filtering, etc. The filtering is preferably made in software.

Further, the processing circuitry is preferably adapted to continuously monitor the variation of the estimated average filling level, and to adjust filter parameter settings of the selected filter character type in accordance with said monitored variation. For example, the output value may be monitored and if the allowed variation, which is a configurable value, such as +/−5 mm, is not kept the selected filter setting will be automatically adjusted depending on the current tank condition. This loop is continuously monitoring the output value to make sure that the estimated average level of the liquid surface always has variations within the nominal accuracy range.

Still further, the processing circuitry is further arranged to regularly repeat the determination of the magnitude of the surface waves in the tank and the adaptation of the filtering.

The processing circuitry may further be arranged to issue an alarm signal when the determined magnitude of the surface waves in the tank exceeds a defined threshold value.

The processing circuitry is preferably adapted to determine local and momentary filling levels at a frequency of at least 0.5 Hz, and most preferably at a frequency of at least 1 Hz.

The present invention is particularly useful for level measurements in tanks arranged on a maritime vessel, wherein the movement of said vessel is rolling caused by sea.

The gauge system can use a transmitter adapted to emit continuous signals, wherein the processing circuitry is adapted to determine local and momentary filling levels based on a phase and/or frequency difference between the received echo signal and a reference signal. Alternatively, the transmitter can be adapted to emit pulsed signals, and wherein the processing circuitry is adapted to determine local and momentary filling levels based on the time between the emission of a pulsed signal and the reception of the echo of said signal.

According to another aspect of the invention there is provided a method of determining the filling level of a liquid in a tank arranged in a mobile unit, said method comprising:

transmitting microwave measuring signals towards the surface of the liquid;

receiving echo signals from the tank;

determining a local and momentary filling level at different times at a certain position in the tank of the container based on said received echo signals;

identifying variations in said local and momentary filling levels corresponding to surface waves in the tank due to movement of said mobile unit; and using the result of said identification for improving the accuracy when estimating an average filling level of the tank.

In accordance with this aspect, similar advantages and preferred features are obtainable as have already been discussed with respect to the first aspect.

These and other aspects of the invention will be apparent from and elicited with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DESCRIPTION OF PREFERRED EMBODIMENTS

Figure 1:
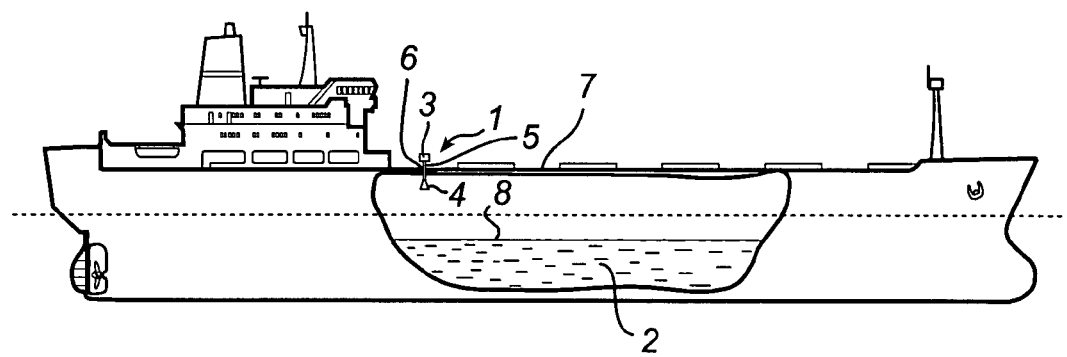
FIG. 1 is a partly exploded and partly cross-sectional schematic side view of a radar level gauging system according to a first embodiment of the present invention.
Figure 2:
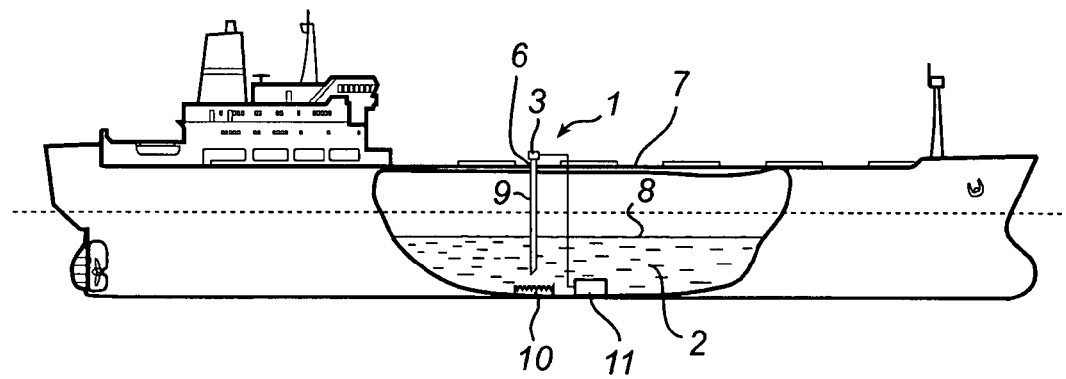
FIG. 2 is a partly exploded and partly cross-sectional schematic side view of a radar level gauging system according to a second embodiment of the present invention.

FIGS. 1 and 2 show schematically radar level gauging systems 1 according to two different embodiments of the present invention.

In brief, the systems in FIGS. 1 and 2 are exemplary radar level gauging systems for determining a filling level of a liquid contained in a tank 2 arranged on a tanker ship. The filling material may be products such as oil, refined products, chemicals and liquid gas. The systems incorporate an electronic unit 3 with processing circuitry for transmitting and receiving radar signals and processing the received signals in order to determine the level 8 of a filling material in the tank 2, an antenna 4 arranged inside the tank for transmitting and receiving radar waves into the tank and a radar wave guide assembly 5 for guiding signals between the electronic unit 3 and the antenna 4 (not shown in FIG. 2). The same antenna could preferably be used both as a transmitter for emitting the output radiation and as a receiver for receiving the reflected echo signal, even though it is also possible to use separate antennas for these functions. The radar level gauge is preferably arranged on the tank roof 7, whereby the waveguide 5 is arrange to protrude into the tank through a tank opening 6. In the embodiment of FIG. 1 the antenna is freely radiating into the tank, whereas the embodiment of FIG. 2 comprises a vertical waveguide 9 in the form of a pipe. The pipe acts as a waveguide enabling the electromagnetic signal from the radar to be transmitted free from disturbing objects, such as in-tank structures, to the liquid surface. The waveguide 9 is terminated above the base of the tank, and the waveguide is open downwards. Below the opening of the waveguide 9, an absorber 10 is preferably arranged. The absorber is preferably arranged on the base of the container, and absorbs the greater part, or all, of the microwave energy that is transmitted towards the liquid surface and which is not reflected by this surface, thereby preventing a bottom echo. The general outline of the above-discussed embodiments are per se previously known, and are disclosed e.g. in WO 01/29523 and WO 03/001160, both said documents hereby incorporated by reference.

In use, the radar level gauge 1 transmits radar energy along the waveguide 5 through the tank roof port and receives reflected energy from the liquid surface 8 to provide an indication of the level of the liquid within the tank. The radar level gauge 1 could be coupled to a remote location (for example a control room) via a signal wire or the like.

Determination of the filling level can be made by means of a comparison and evaluating of the time difference between transmitted and reflected beam in a calculation and controlling unit, which is per se well known in the art. Various radar principles may be employed for the radar level gauge. One of these is the impulse delay method (pulse radar method), another is the frequency modulated continuous wave (FMCW) radar method. In the FMCW radar method, the delay is determined in an indirect manner by transmitting a frequency modulated signal and creating a difference between the transmitted and the received momentary frequency. The pulse radar method, on the other hand, uses the radiation of short microwave pulses, also known as bursts, wherein the direct time duration is determined between the transmission and the reception of the individual pulses. The received signals can be processed by a processor with software for analyzing the signals in order to determine the filling level, and the processor is preferably a microprocessor based circuit. The functions and algorithms implemented by said signal processor, some of which can be embodied in hardware and some of which can be embodied in software, are per se known from the art will not be discussed further in this application.

The processing circuitry is arranged to determine local and momentary filling levels at times at a certain position in the tank of the container, such as in or below the waveguide 9 of FIG. 2. The processing circuitry is further adapted to identify variations between the local and momentary filling levels corresponding to surface waves in the tank due to movement of said mobile unit, and to use the result of said identification for improving the accuracy when estimating an average filling level of the tank.

According to one embodiment, the monitoring of the variations of the momentary filling levels is used to analyze the surface waves in a tank by monitoring the wave height and wave periodicity. From this information a filter character type is determined and the gauge thereby adapts automatically to the current tank condition by selecting the best filter character type with the target to keep the output value variations within the stated instrument accuracy range.

Figure 3:
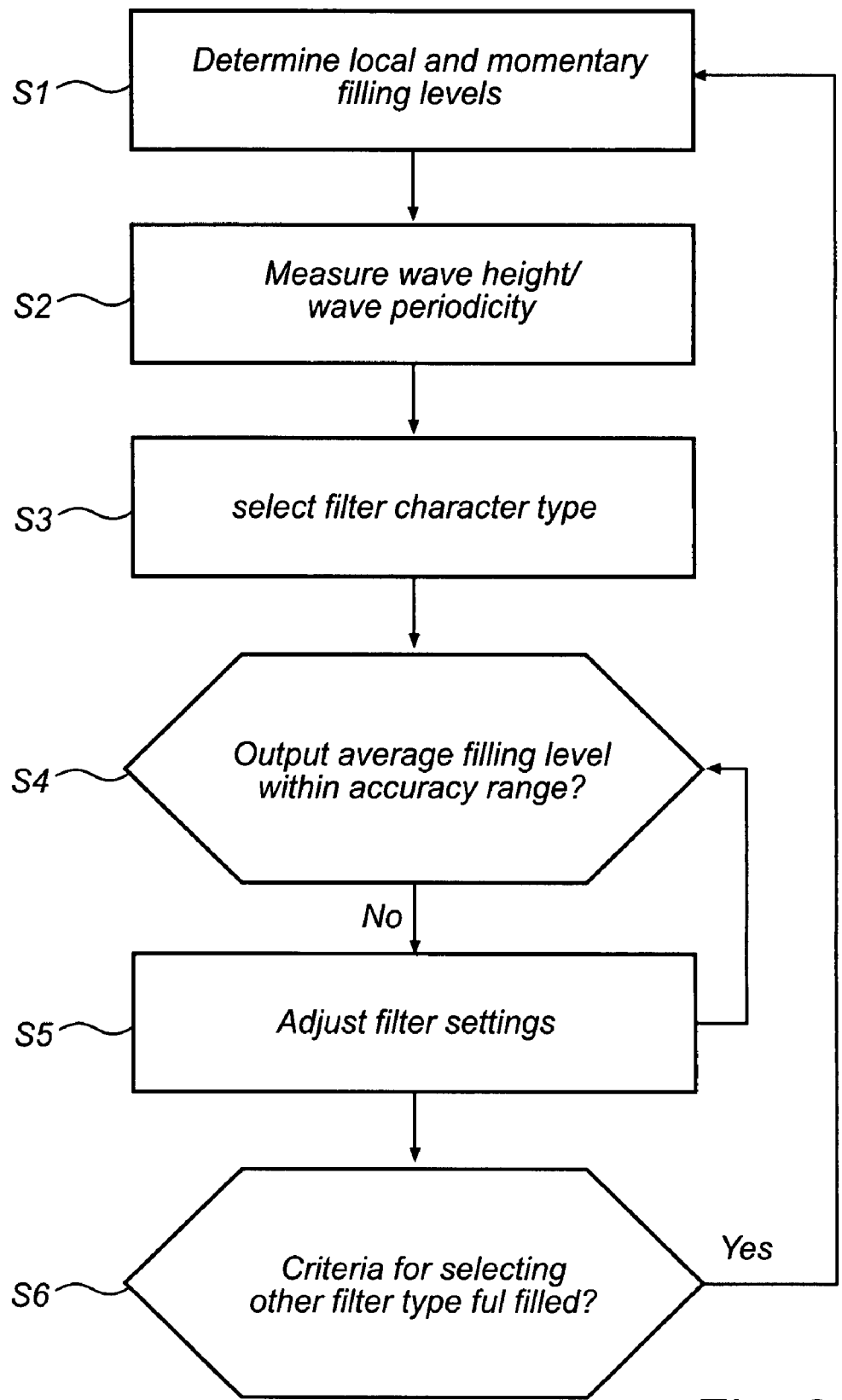
FIG. 3 is a schematic flow diagram illustrating a method for automatic filter selection and filter adjustment in accordance with one embodiment of the present invention.

An embodiment of a method for automatic filter selection and filter adjustment is illustrated in FIG. 3. Hereby, local and momentary filling levels are determined (step S1), and the surface waves in the tank are monitored by measuring the wave height and/or wave periodicity (step S2). The gauge is provided with a set of more than one filter character type, and based on the measured wave height/periodicity the filter character type best for the current environmental conditions is selected (step S3). The available filter character types may e.g. be a filter character type for no surface waves, which can be equal to a default filtering of the system, a filter character type for low magnitude of surface waves and a filter character type for high magnitude of surface waves. Essentially any type of filter character types can be used, such as low pass filtering, Butterworth filtering, using different number of poles etc. The filtering is preferably made in software. The filters can achieve virtually any filtering effect than can be expressed as a mathematical algorithm.

Once a suitable filter character type has been selected the gauges starts to produce an output value indicating an estimate of the average filling level, based on a default setting of the filter parameters for the selected filter character type. The output value is then monitored (step S4) and if a variation requirement, which is a configurable value of e.g. +/−5 mm, is not kept the logic will then adjust the selected filter setting (step S5). This will be repeated until the required variation is obtained, and the loop is preferably continuously monitoring the output value to make sure that the apparent observed liquid surface momentarily is always within these limits.

Further, to make sure that the correct filter character type is being used the wave height and periodicity is preferably checked regularly (step S6). If the criterion for another filter character type or combination of filter types is better suited for the current tank environment condition the gauge logic will select this and the process will return to step S1.

By means of this process, the filter character type and filter settings can be selected to always provide the optimal filter which provides the fastest average liquid level change with respect to the current environmental condition within the tank.

According to another embodiment, the monitoring of the variations of the momentary filling levels is used for detection of local and momentary filling levels being equal to a bottom level of the tank. These embodiments are particularly useful for LNG applications.

In such an embodiment, the average filter level may be calculated and presented based on e.g. a continuously low pass filtered level adapted to the encountered environmental situation. In addition, the system monitors, in appropriate real time, typically 1 Hz sampling, the signal amplitude or the returned radar echo and a threshold is set, that discriminates between liquid echo and the echo from the absorber device with lower amplitude/strength on an LNG tank bottom or the higher echo from another tanker tank bottom. Hereby, occurrence of local and momentary filling levels being equal to a bottom level of the tank can be discriminated, and e.g. be announced to the operator, e.g. in duty-cycle form, in order to inform him/her to take appropriate action. Such action can be either a) to stop discharging to allow the most accurate determination of average level for the remaining cargo before the estimation is distorted or b) continue to discharge until there is no detection of liquid any longer and the tank can be regarded as completely empty and dry, preferably verified with the correlation of the continuously (higher) bottom temperature.

For announcing the occurrence of local and momentary filling levels being equal to a bottom level of the tank, the processing circuitry may be arranged to issue an alarm signal, which can be used to activate one or several alarm(s). The alarming units can be designed in several ways to alert an operator about the current situation. As some examples: an acoustic signal can be activated, alarming lamps can start to light or twinkle or some kind of signaling can be activated on a control board, alarms on a computer screen or a remote unit (phone, minicall, radio etc.) are activated.

As a secondary indicator, a temperature sensor 11 (see FIG. 2) may be arranged at or near the bottom of the tank, in order to indicate occurrence of local and momentary filling levels being equal to a bottom level of the tank. Such a bottom located temperature sensor can be used to indicate a low level condition, since when the temperature at this point is significantly higher than the liquid temperature (LNG is typically about −160 degrees Celsius), it means that the tank is "dry" at the measuring point. Hereby, the input from the temperature sensor can be used for verification of a previously discriminated occurrence of local and momentary filling levels being equal to a bottom level of the tank, and thereby increase the robustness and reliability of the system.

The above-discussed radar level gauge system is very robust and reliable, and can advantageously be used also for implementation of high or low level alarms, overfill control, etc.

It is to be appreciated by those versed in the art that various combinations of the above-discussed embodiments and specific features of the disclosed radar level gauging system are possible. For example, the automatic filter selection functionality may be combined with low level detection functionality. Further, even though the above-discussed examples are described in relation to a ship, it is evident that the invention can be used on all moving units comprising a tank for storing a liquid. Such and other obvious modifications must be considered to be within the scope of the present invention, as it is defined by the appended claims.

What is claimed is:

1. A radar level gauging system for determining a filling level of a liquid in a tank arranged in a mobile unit, said system comprising:
   a transmitter for transmitting microwave signals towards said liquid;
   a receiver for receiving reflected echo signals from the tank; and
   processing circuitry for determining momentary filling levels at different times at a certain position in the tank based on said received echo signals;
   wherein the processing circuitry is further adapted to identify variations in said momentary filling levels corresponding to surface waves in the tank due to movement of said mobile unit, and to use the result of said identification for improving the accuracy when estimating an average filling level of the tank; and
   wherein the result of said identification is used for detection of momentary filling levels being equal to a bottom level of the tank.

2. The radar level gauging system of claim 1, wherein the processing circuitry is arranged to estimate the average filling level of the tank based on a filtering of the determined momentary filling levels, and wherein the discriminated occurrence at certain times of momentary filling levels being equal to a bottom level of the tank is usable as an accuracy indicator.

3. The radar level gauging system of claim 1, wherein the processing circuitry is adapted to discriminate occurrence of momentary filling levels being equal to a bottom level of the tank based on a relation between at least one of an amplitude and a signal strength of the received echo signals and a defined threshold value.

4. The radar level gauging system of claim 1, wherein the processing circuitry is further arranged to issue an alarm signal when occurrence of filling levels being equal to a bottom level of the tank is discriminated.

5. The gauge system of claim 1, wherein the processing circuitry is further arranged to issue a control signal for controlling a discharge function of the tank when occurrence of filling levels being equal to a bottom level of the tank is discriminated.

6. The radar level gauging system of claim 1, further comprising a temperature sensor arranged in the vicinity of the bottom of the tank, said sensor being adapted to provide a secondary indication of the filling level being equal or close to the bottom level of the tank.

7. A radar level gauging system for determining a filling level of a liquid in a tank arranged in a mobile unit, said system comprising:
   a transmitter for transmitting microwave signals towards said liquid;
   a receiver for receiving reflected echo signals from the tank; and
   processing circuitry for determining momentary filling levels at different times at a certain position in the tank based on said received echo signals;
   wherein the processing circuitry is further adapted to identify variations in said momentary filling levels corresponding to surface waves in the tank due to movement of said mobile unit, and to use the result of said identification for improving the accuracy when estimating an average filling level of the tank,
   wherein the processing circuitry is arranged to estimate the average filling level of the tank based on a filtering of the determined momentary filling levels,
   said processing circuitry further being arranged to determine, based on the identification of the variations in the momentary filling levels, the magnitude of the surface waves in the tank, and based on this, to adapt the filtering for the estimation of the average filling level.

8. The radar level gauging system of claim 7, wherein the magnitude of the surface waves is determined based on at least one of wave height and wave periodicity determined from the momentary filling levels.

9. The radar level gauging system of claim 7, wherein processing circuitry is arranged to select, based on the determined magnitude of the surface waves in the tank, one of a plurality of available filter character types.

10. The radar level gauging system of claim 9, wherein the available filter character types comprises at least: a filter character type for no surface waves, a filter character type for low magnitude of surface waves and a filter character type for high magnitude of surface waves.

11. The radar level gauging system of claim 10, wherein the filter character type for no surface waves is a default filtering of the system.

12. The radar level gauging system of claim 8, wherein the processing circuitry is adapted to continuously monitor the variation of the estimated average filling level, and to adjust filter parameter settings of the selected filter character type so the variations will remain within set requirements.

13. The radar level gauging system of claim 7, wherein the processing circuitry is further arranged to regularly repeat the determination of the magnitude of the surface waves in the tank and the adaptation of the filtering.

14. The radar level gauging system of claim 7, wherein the processing circuitry is further arranged to issue an alarm signal when the determined magnitude of the surface waves in the tank exceeds a defined threshold value.

15. The radar level gauging system of claim 1 or 7, wherein the processing circuitry is adapted to determine momentary filling levels at a frequency of at least 0.5 Hz.

16. The radar level gauging system of claim 1 or 7, wherein said tank is arranged on a maritime vessel, wherein the movement of said vessel is rolling caused by sea.

17. The radar level gauging system of claim 1 or 7, wherein said liquid is a liquefied gas or a liquid chemical substance which does not accumulate deposits on the tank bottom.

18. The radar level gauging system of claim 1 or 7, further comprising a waveguide in the form of a vertically arranged pipe, through which the transmitted and received microwave signals are propagated, whereby the filling level is determined at a position in the pipe or below an opening of said pipe.

19. The radar level gauging system of claim 18, further comprising an absorber for microwaves placed at the bottom of the tank, below the opening of the pipe, to absorb at least part of the microwave energy that is incident on the base of the tank.

20. A method of determining the filling level of a liquid in a tank arranged in a mobile unit, said method comprising:
   transmitting microwave measuring signals towards the surface of the liquid;
   receiving echo signals from the tank;
   determining momentary filling levels at different times at a certain position in the tank based on said received echo signals;
   identifying variations in said momentary filling levels corresponding to surface waves in the tank due to movement of said mobile unit; and
   using the result of said identification for detection of momentary filling levels being equal to a bottom level of the tank for improving the accuracy when estimating an average filling level of the tank.

21. The method of claim 20, wherein the estimation of the average filling level of the tank is based on a filtering of the determined momentary filling levels, and wherein the discriminated occurrence at certain times and momentary filling levels being equal to a bottom level of the tank is used as an accuracy indicator.

22. The method of claim 20, wherein occurrence of momentary filling levels being equal to a bottom level of the tank is discriminated based on the relation between at least one of an amplitude and a signal strength of the received echo signals and a defined threshold value.

23. The method of claim 20, further comprising:
issuing of an alarm signal when occurrence of filling levels being equal to a bottom level of the tank is discriminated.

24. The method of claim 20, further comprising:
issuing of a control signal for controlling a discharge function of the tank when occurrence of filling levels being equal to a bottom level of the tank is discriminated.

25. The method of claim 20, further comprising:
measuring a temperature in the vicinity of the bottom of the tank, and using said temperature measurement as a secondary indication of the filling level being equal or close to the bottom level of the tank.

26. A method of determining the filling level of a liquid in a tank arranged in a mobile unit, said method comprising:
transmitting microwave measuring signals towards the surface of the liquid:
receiving echo signals from the tank;
determining momentary filling levels at different times at a certain position in the tank based on said received echo signals;
identifying variations in said momentary filling levels corresponding to surface waves in the tank due to movement of said mobile unit; and
using the result of said identification for improving the accuracy when estimating an average filling level of the tank,
wherein the estimation of the average filling level of the tank is based on a filtering of the determined momentary filling levels, and
wherein said method, further comprises
determining, based on the identification of the variations in the momentary filling levels, the magnitude of the surface waves in the tank, and, based on this,
adapting the filtering for the estimation of the average filling level.

27. The method of claim 26, wherein the magnitude of the surface waves is determined based on at least one of wave height and wave periodicity determined from the momentary filling levels.

28. The method of claim 26, further comprising:
selection, based on the determined magnitude of the surface waves in the tank, of one of a plurality of available filter character types.

29. The method of claim 28, wherein the available filter character types comprises at least: a filter character type for no surface waves, a filter character type for low magnitude of surface waves and a filter character type for high magnitude of surface waves.

30. The method of claim 29, wherein the filter character type for no surface waves is a default filtering of the system.

31. The method of claim 27, wherein the processing circuitry is adapted to continuously monitor the variation of the estimated average filling level, and to adjust filter parameter settings of the selected filter character type in accordance with the set requirements for the variation.

32. The method of claim 26, wherein the determination of the magnitude of the surface waves in the tank and the adaptation of the filtering are regularly repeated.

33. The radar level gauging system of claim 26, further comprising:
issuing of an alarm signal when the determined magnitude of the surface waves in the tank exceeds a defined threshold value.

34. The method of claim 20 or 26, wherein the filling level curve is based on filling levels determined at a frequency of at least 0.5 Hz.

35. The method of claim 20 or 26, wherein said tank is arranged on a maritime vessel, wherein the movement of said vessel is rolling caused by sea.

36. The method of claim 20 or 26, wherein said liquid is a liquefied gas or a liquid chemical substance which does not accumulate deposits on the tank bottom.

37. The method of claim 20 or 26, wherein the signals are transmitted through a waveguide in the form of a vertically arranged pipe, whereby the filling level is determined at a position in the pipe or below an opening of said pipe.

38. The method of claim 37, further comprising:
providing an absorber for microwaves at the bottom of the tank, below the opening of the pipe, to absorb at least part of the microwave energy that is incident on the base of the tank.

* * * * *